Dec. 16, 1969        F. CELORIO MENDOZA        3,484,087
OUTSIDE AND INSIDE COOKING OVEN

Filed Jan. 25, 1968        4 Sheets-Sheet 1

INVENTOR
FAUSTO CELORIO MENDOZA
BY *Gifford and Young*
ATTORNEYS

Dec. 16, 1969   F. CELORIO MENDOZA   3,484,087
OUTSIDE AND INSIDE COOKING OVEN

Filed Jan. 25, 1968   4 Sheets-Sheet 3

INVENTOR
FAUSTO CELORIO MENDOZA
BY *Jeffers and Young*
ATTORNEYS

Dec. 16, 1969   F. CELORIO MENDOZA   3,484,087
OUTSIDE AND INSIDE COOKING OVEN
Filed Jan. 25, 1968   4 Sheets-Sheet 4

INVENTOR
FAUSTO CELORIO MENDOZA
BY Jeffers and Young
ATTORNEYS

United States Patent Office 3,484,087
Patented Dec. 16, 1969

3,484,087
OUTSIDE AND INSIDE COOKING OVEN
Fausto Celorio Mendoza, Cumbres de Acultzingo 185,
Lomas de Chapultepec, Mexico
Filed Jan. 25, 1968, Ser. No. 700,406
Claims priority, application Mexico, Feb. 21, 1967,
94,158
Int. Cl. F27b 9/02, 9/24
U.S. Cl. 263—8                                    3 Claims

ABSTRACT OF THE DISCLOSURE

A decoction oven is provided with a first endless belt which receives a product and heats the product by conduction. The product on the first belt is transferred to one or more additional belts which subject the product to irradiated heat.

---

The present invention relates to an inner and outer decoction oven and, more particularly, relates to an oven adapted to initiate decoction at the outer surface thereof, preferably in the upper part thereof, and also adapted to finish the decoction in the inside thereof.

Serious and extensive research have been made with the purpose of determining which process of decoction presents the greatest advantages.

As it is well known, the decoction of a product can be obtained by means of direct heating of the said product, that is, by heat conduction. It is also possible to obtain the decoction of a product by heating the means surrounding the same, that is, by heat irradiation.

The process of decoction by heat conduction presents the advantage of being an extremely fast process, wherein it is taken full advantage of both fuel and heat, but presents nevertheless a great disadvantage in that the products cooked by this process lack of the required characteristics of decoction uniformity.

By the contrary, the process of decoction by heat irradiation provides a product having an excellent uniformity of decoction, but said process is relatively time consuming and represents an additional fuel expense, since it is not taken full advantage of heating in this process.

It is obvious that a combination of both processes could be obtained by simply locating the product within an oven exactly over a surface being heated, thus providing at the same time for the product to be subjected to a conducted heat and the means surrounding the same to be also heated, whereby this product will simultaneously receive radiant heating.

In spite of the above, it has been found now that, in order to obtain a more uniform and desirable decoction of the product, in a shorter period of time, it is preferable to employ a decoction process by heat conduction in a former stage, and to continue the process by heat irradiation, in a second stage.

It should become perfectly clear that with the oven of the present invention a two-stage decoction is obtained. In the former stage, heating is applied to the product exclusively by conduction so as, afterwards, in a second stage of decoction, heat be supplied to said product exclusively by irradiation. In other words, the process to be followed in an oven according to the present invention comprises subjecting a product to a decoction process comprising two perfectly defined and completely separated stages, wherein heat is supplied by irradiation and by conduction, respectively, in a nonsimultaneous fashion.

It is an object of the present invention to provide an oven wherein the product attains a completely uniform decoction in a relatively short period of time.

It is a further object of the present invention to provide a decoction oven which is particularly adapted to initiate the decoction by heat conduction on one of its outer surfaces, and which is designed to finish the decoction in the inside thereof.

It is a main advantage of the oven of the present invention that, by employing the same, a product with excellent characteristics of uniform decoction is obtained.

It is a further advantage of the oven of the present invention that, by using the same, great savings are possible relating fuel, since heat wastes are minimized.

These and other objects and advantages of the present invention will be obvious in part and partially will be more clearly apparent from the following description taken jointly with the drawings, wherein like reference characters will refer to similar parts, and wherein.

Figure 1:
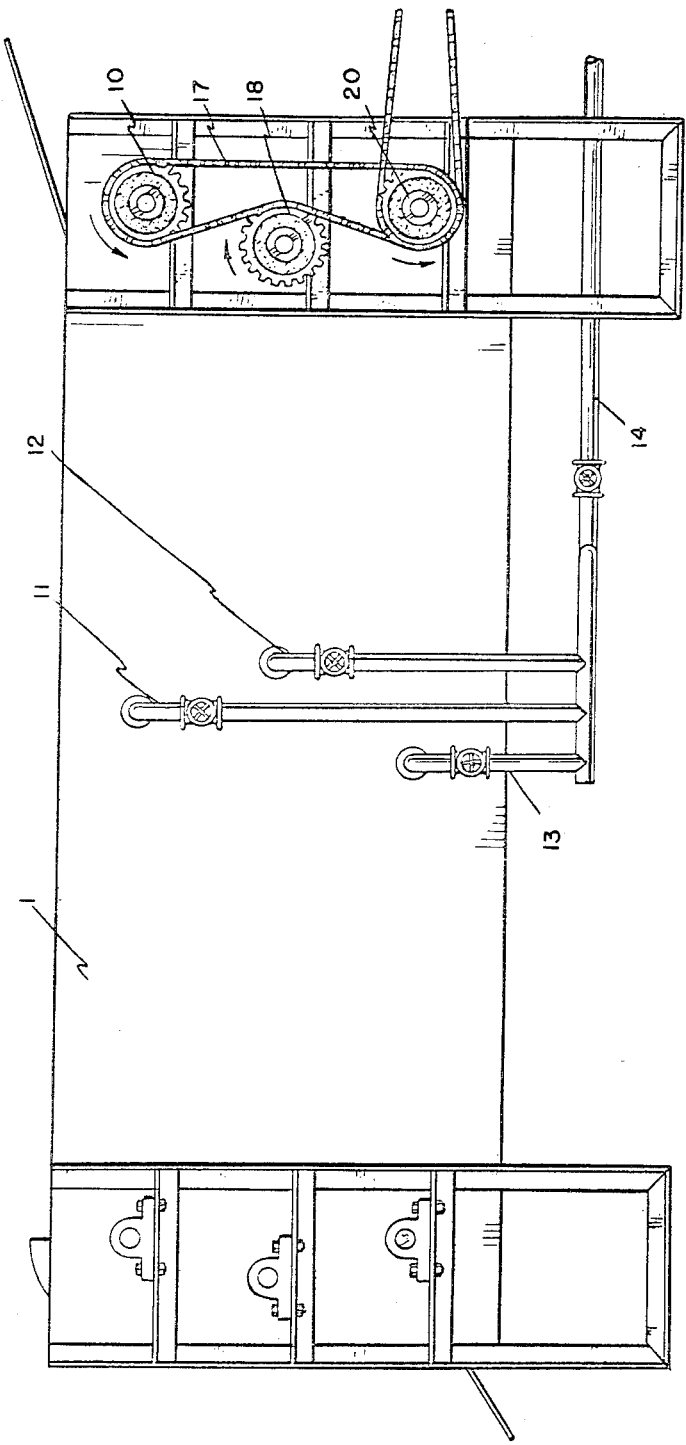
FIGURE 1 is a side view of the oven of the present invention.

Referring now to figures, and particularly to FIGURE 1, it can be seen that the oven of the present invention is formed by a housing 1, which both at its bottom and at its side, front and rear walls, has a double wall, in order to provide a clearance between both walls with the purpose of incorporating a heat insulating material 15 therein.

In the shown embodiment, the oven of the present invention is also constituted by three endless belts, one of them serving precisely as a cover for the oven while the remaining two are located in the interior of the oven.

Figure 2:
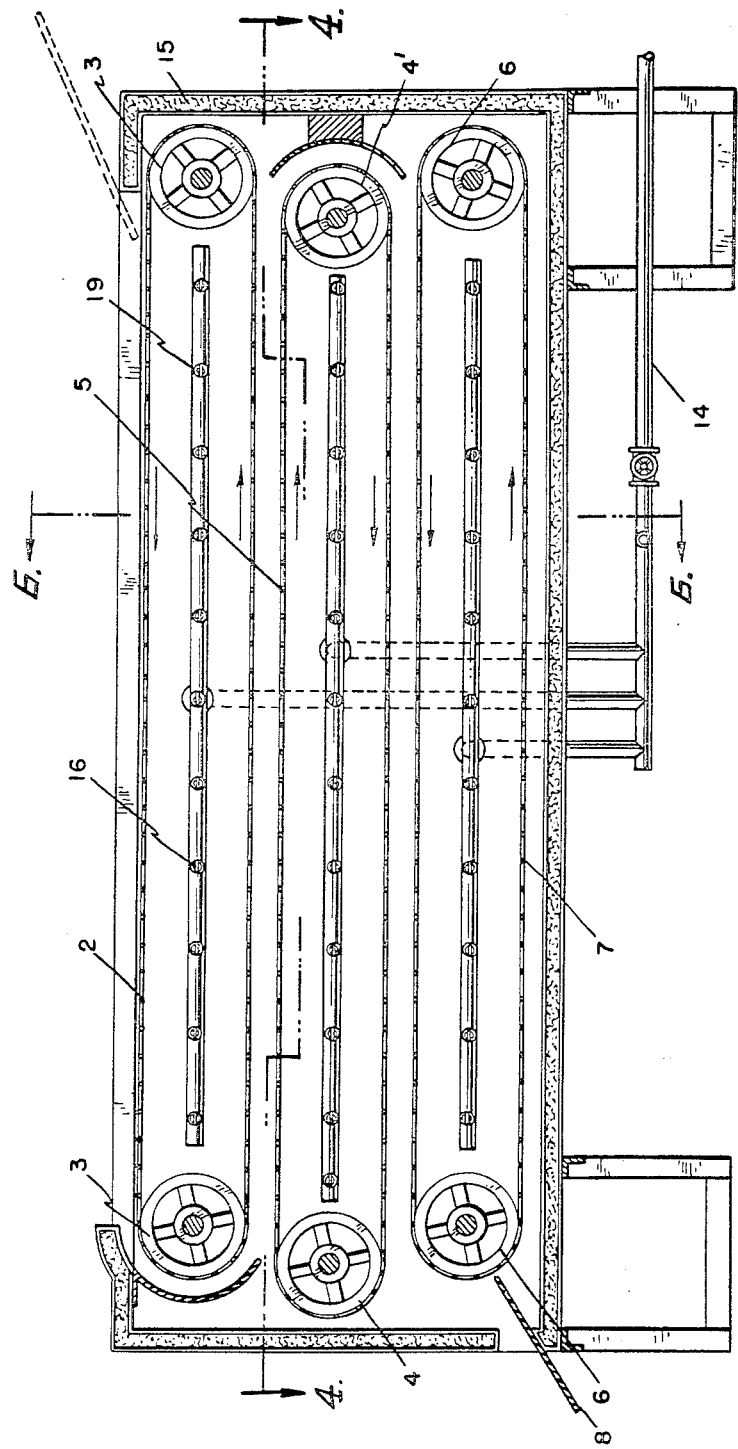
FIGURE 2 is a side view of the oven of the present invention, with some of the parts thereof in section to illustrate to a greater detail, the inner parts forming the same.
Figure 3:
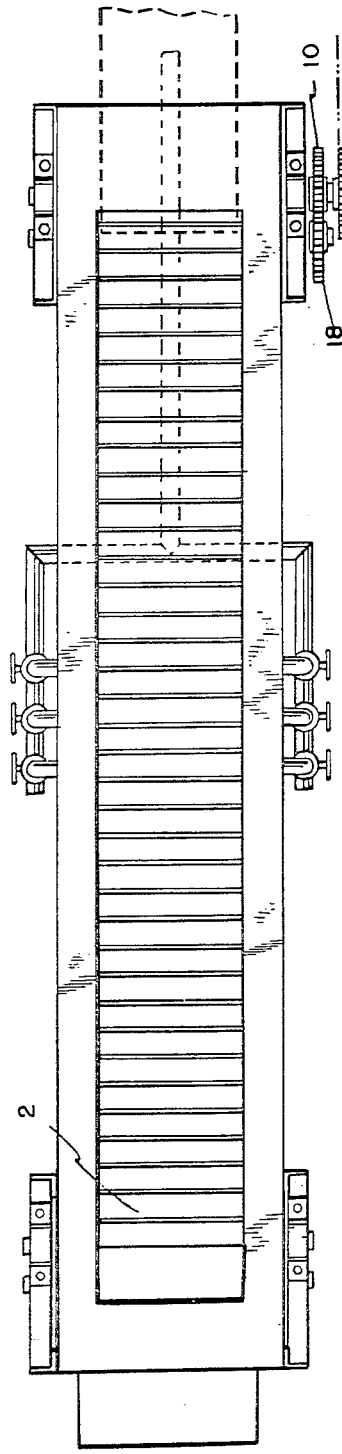
FIGURE 3 is an upper plan view of the oven of the present invention.
Figure 4:
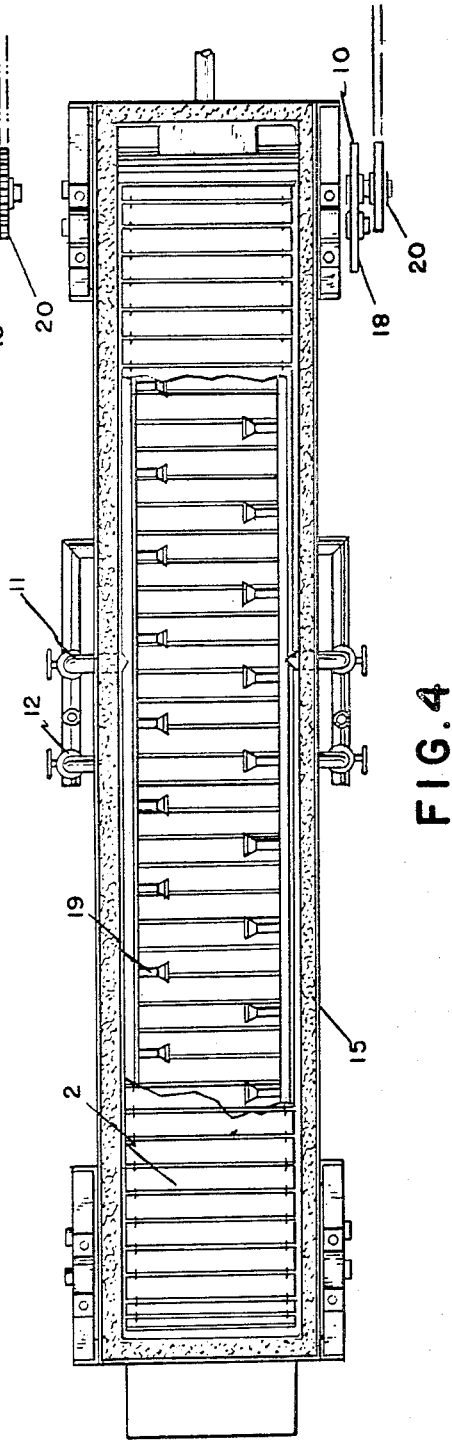
FIGURE 4 is an upper plan view of the oven of the present invention, showing the inner parts thereof.
Figure 6:
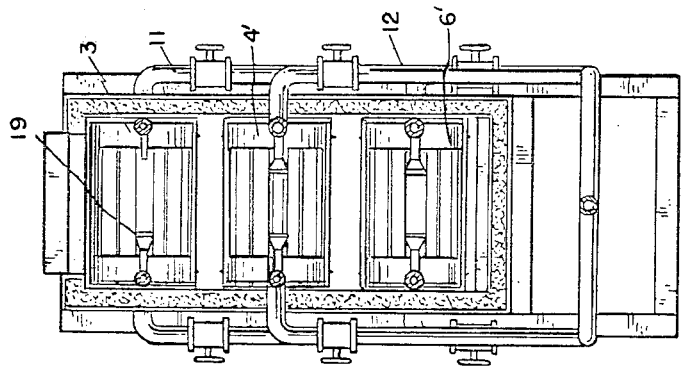
FIGURE 6 is a rear view of the oven of this invention depicting the parts located in the inside thereof.
Figure 5:
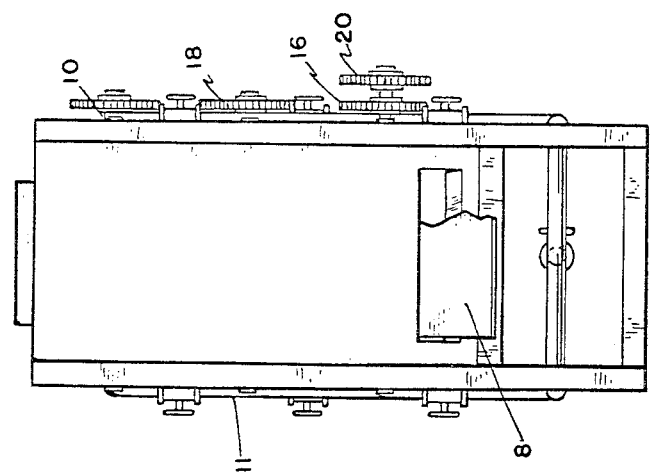
FIGURE 5 is a front view of the oven.

As can be seen in FIGURE 2, within the oven are located three endless belts running parallel one above the other. As above mentioned, the upper endless belt 2 also serves as a cover for the oven, while the endless belts 5 and 7 run below said endless belt 2.

The endless belt 2 is supported at its front end on a roll 3, and at its rear part of a roll 3'. Likewise, the endless belt 5 is supported at its front part on a roll 4 and at its rear part on the roll 4'. Similarly, the endless belt 7 is supported at its front part on a roll 6 and at its rear part on a roll 6'.

Each of said rolls is supported through an axis on the housing, and it is also to be noted that one of the ends of each of said roll axes is provided with a sprocket so as to provide for the motion of said rolls and, therefore, for the motion of said belts.

This motion is provided in such a manner that the belt 2 displacement is effected from the rear part forwards, while the belt 5 will move reversely and the belt 7 will move similarly to belt 2. In the front end of belt 7, and beneath the same, a plate 8 will be provided for the egress of the product.

The heating supplying means are constituted by a series of tubings 11, 12 and 13 which supply fuel to a series of burners. Said tubings 11, 12 and 13 extend from the main tubing 14. Each of said tubings is provided with a valve for independently or jointly regulating the fuel flow.

Said burners are located as follows: a series of burners 19 are located within the metallic endless belt 2, whereas the rest of the burners are located indistinctly within the oven.

As above discussed, each of the axis of the rolls related to the endless belts, presents an additional sprocket in one of its ends, with the purpose of rotating said rolls and provide for the movement of said belts. The additional sprocket 10 of roll 3' in said belt 2 is connected to the additional sprocket 16 of roll 6' in the endless belt 7. On the other hand, the additional sprocket 18 is so located as to mesh the chain 17 connecting the additional sprockets 10 and 16, in order to obtain the movement of said sprocket 18 reversely to the movement of the sprockets 10 and 16. Furthermore, the axis of said roll 6' is provided with another sprocket 20 which is coaxial to said sprocket 16. Said sprocket 20 is connected to a motion supplying source which will be transferred by said sprocket to the sprocket 16 and hence to the entire system.

When the oven of this invention is operating, the product is supplied through an endless belt, which forms no part of this invention, and contacts the endless belt 2.

It is important to note that precisely during the period of time during which the product is on the belt 2, the first process of decoction will be initiated, in which said product will be subjected to a direct heating, that is, by heat conduction.

Once the product reaches the front end of said belt 2, it will fall and become in contact with the metallic endless belt 5. In this very moment, the first process of decoction ends and begins the second decoction process which will be performed on the endless belts 5 and 7, wherein the product is subjected to a heating preferably by irradiation, that is, the product will travel in the oven from the front part to the rear part, supported on said endless belt 5. When the product reaches the rear end of the endless belt 5, it will fall inside the oven and become in contact with the belt 7, which transfers the same from the rear part of the oven to the front part thereof. Once the product is at the end of the endless belt 7, it falls into the plate 8 which will eject the same out, into any suitable system of reception.

It should be perfectly clear that, although an oven including endless belts has been described, it is possible to modify the conduction system for the product, since the only really novel in this invention lies on the combination of two different decoction processes, during one of which the product is supplied with heat exclusively by conduction and in the other it is supplied with heat exclusively by irradiation.

According to the above, although a preferred embodiment of this invention has been described, those skilled in the art will resort several changes and modifications without falling out of the spirit and scope of this invention, whereby it is intended that the disclosure and drawings are merely regarded as illustrative and not as limitative.

Having thus described the invention, I consider as a novelty and, therefore, I claim as my property the content of the following claims:

1. In an outside and inside cooking oven comprising, in combination: a housing having double walls containing a heat insulating material therebetween, said housing being open at the upper part thereof and having an opening disposed in the lower portion of one of the side walls to provide for the egress of the product, a number of endless cooking conveying belts disposed within said housing, each of said conveying belts having a number of burners positioned inside said conveying belts, one of said endless belts being positioned directly below and adjacent the upper opening of the housing to serve as a cover for said housing.

2. In an outside and inside cooking oven according to claim 1 wherein the endless belt disposed below the upper housing opening provides heat by conduction to partially cook the product exteriorly of the oven as the product is being conveyed into the oven.

3. In an outside and inside cooking oven according to claim 2 wherein the remaining conveying belts carry the product through the oven so that the product is cooked by both conductive and radiant heat emanating from said remaining conveying belts.

References Cited

UNITED STATES PATENTS

| | | | |
|---|---|---|---|
| 1,344,893 | 6/1920 | Hofmann | 263—8 X |
| 1,355,091 | 10/1920 | Davies | 263—8 X |
| 1,561,315 | 11/1925 | Enciso | 107—57 |
| 2,093,061 | 9/1937 | Wallace | 263—8 |
| 2,262,172 | 11/1941 | Engels et al. | 107—57.4 |
| 2,709,412 | 5/1955 | Eagerman | 263—8 X |
| 2,942,562 | 6/1960 | Luc | 107—57.3 X |
| 3,111,913 | 11/1963 | Mladek et al. | 107—57.1 X |
| 3,310,007 | 3/1967 | Ford | 107—57.4 |

JOHN J. CAMBY, Primary Examiner.

U.S. Cl. X.R.

34—201; 107—57; 99—443